Sept. 4, 1962  F. M. BALUCK ETAL  3,052,278
DEVICES FOR FORMING GROOVES IN ARTICLES
Filed Feb. 25, 1959  3 Sheets-Sheet 1
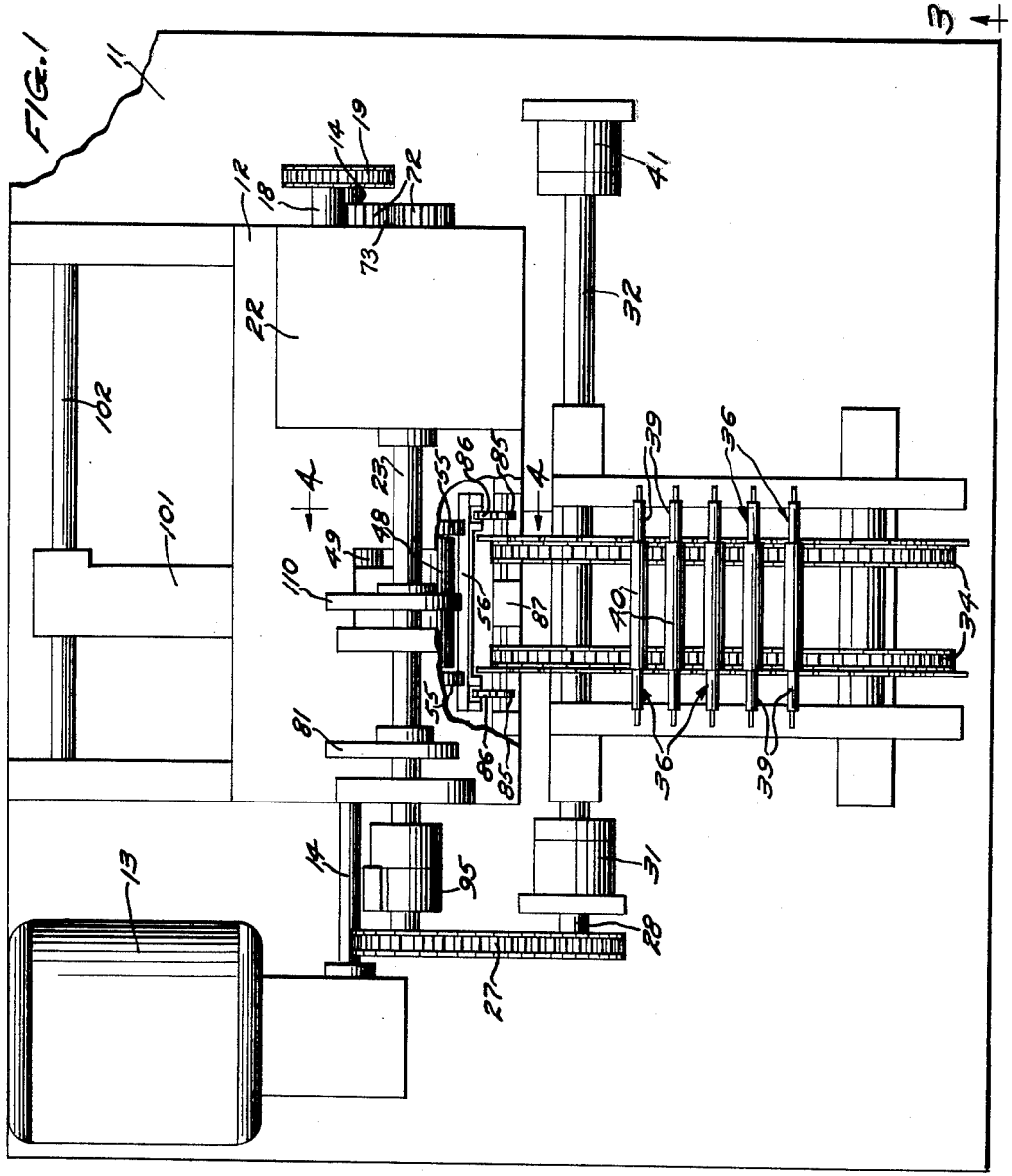
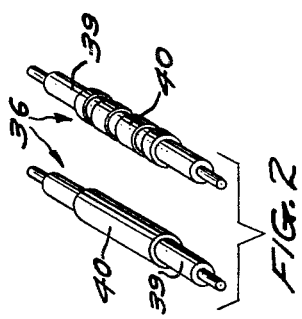
INVENTORS
F. M. BALUCK
R. K. CAMPBELL
J. HANSEN
BY A. C. Schwarz, Jr.
ATTORNEY

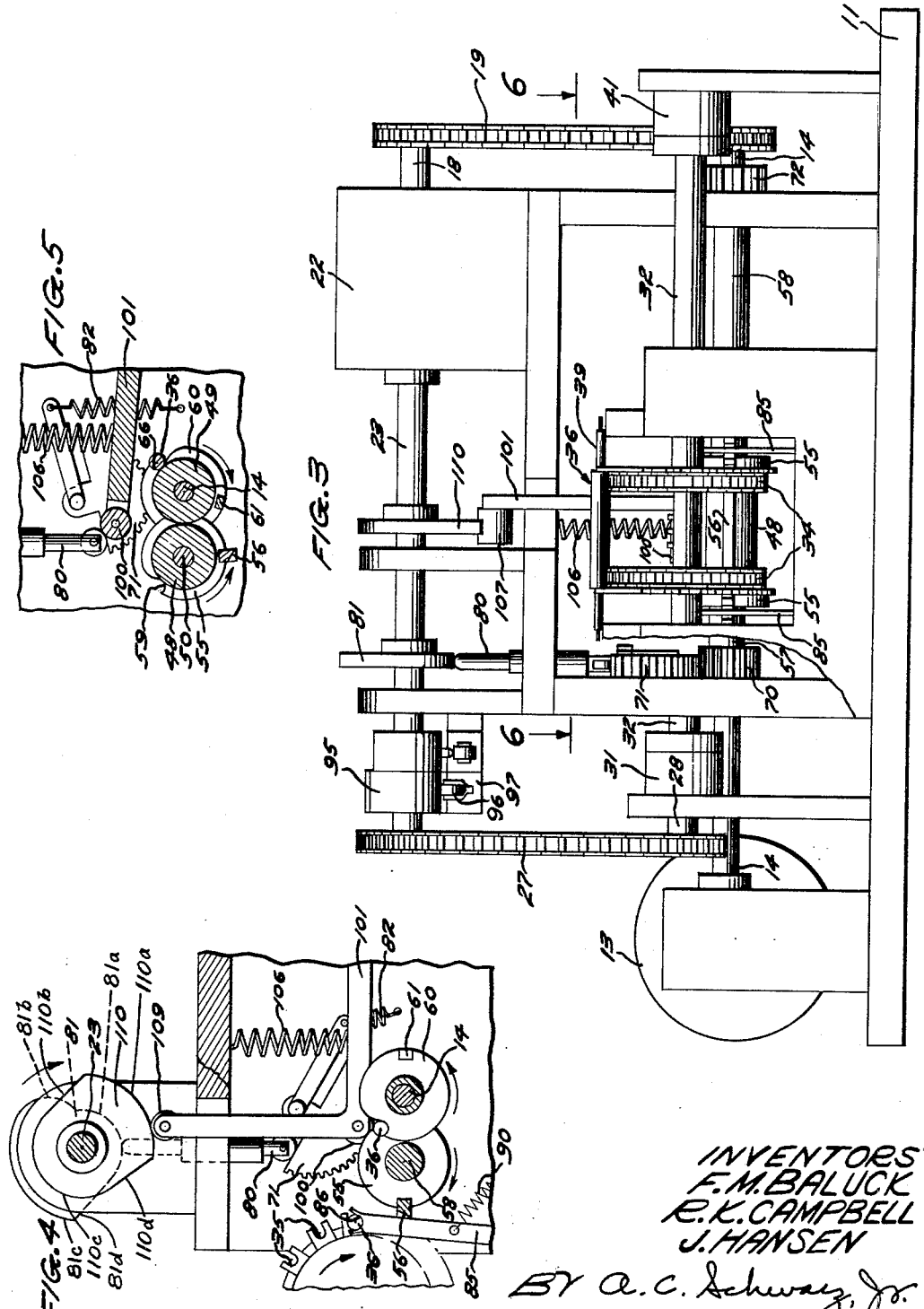

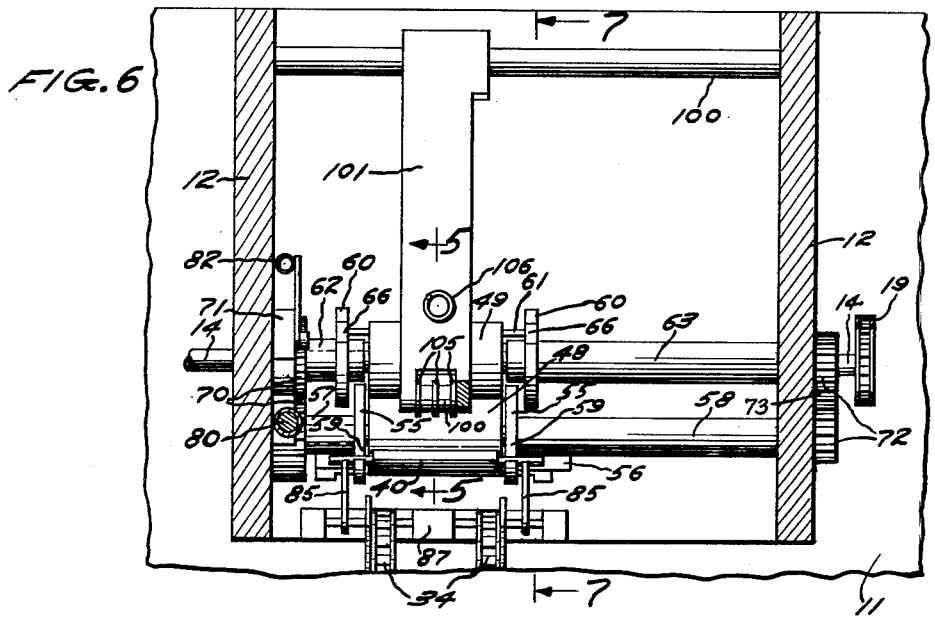
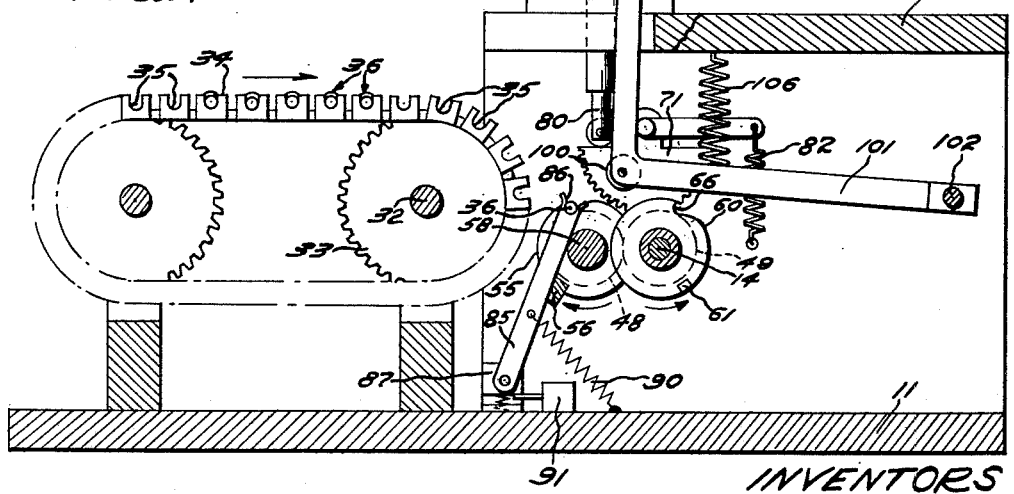

United States Patent Office 3,052,278
Patented Sept. 4, 1962

3,052,278
DEVICES FOR FORMING GROOVES IN ARTICLES
Francis M. Baluck, Morristown, N.J., and Robert K. Campbell and Jan Hansen, Chicago, Ill., assignors to Western Electric Company, Incorporated, New York, N.Y., a corporation of New York
Filed Feb. 25, 1959, Ser. No. 795,551
7 Claims. (Cl. 153—54)

This invention relates to devices for forming grooves in articles and most particularly to devices for forming grooves in tubular members.

In the past, a common method employed to form a groove in a tubular member or sleeve has been to support the sleeve upon one forming roller and then engage the sleeve with another forming roller. One of the disadvantages of such a procedure is that it is extremely difficult to automatically move the tubular members into and out of work position, since one forming roller has to be positioned inside the tubular member. Also, this procedure cannot be followed in cases where the tubular member is filled with some substance.

One of the objects of this invention is to provide a device for forming peripheral grooves in articles.

Another of the objects of this invention is to provide a device for forming grooves in tubular members or sleeves fed through the devices in sequence.

A further object of this invention is to provide a device wherein a tubular member in which a groove is to be formed is supported on the peripheries of a pair of rotating rollers.

A still further object of this invention is to provide a device for forming grooves in metallic sleeves which are filled with a compressible substance.

One embodiment of the present invention may include a pair of rollers rotating in the same direction and positioned adjacent to each other for supporting a tubular member or sleeve which is then engaged by a forming roller. A pair of circular transfer members concentric with and on opposite sides of one of the rollers is provided with a pair of notches which receive the tubular member from a conveyor and, when rotated through a short arc, dispose the member in work position on the pair of rollers. A second pair of circular transfer members, similar to the first pair and associated with the other roller of the pair, are provided with notches which pick up the tubular member and remove it from the work position, when rotated through a short arc.

Other objects and advantagees of the invention will become apparent by reference to the following detailed description and the accompanying drawings illustrating a preferred embodiment of the invention in which:

FIG. 1 is a plan view of a device embodying the principles of the present invention and showing the manner in which the various parts of the device are driven;

FIG. 2 is a perspective view illustrating work parts before and after the forming operation;

FIG. 3 is a front view of the device showing the arrangement of actuating cams and the manner in which work parts are carried by a conveyor toward a work position;

FIG. 4 is a fragmentary cross-sectional view taken on line 4—4 of FIG. 1 depicting the positions of the various elements of the device during the phase of operation when a work part is being formed;

FIG. 5 is a view of a fragment of FIG. 4 showing the positions of the various parts of the device as the formed work part is removed from work position after the forming step;

FIG. 6 is a cross-sectional view taken on line 6—6 of FIG. 3 depicting the relative positions of rollers that support and transfer members that carry the work part; and FIG. 7 is a cross-sectional view taken on line 7—7 of FIG. 6 showing the structural relationships of the conveyor and that portion of the device that actually performs the forming operation.

Referring now in detail the the drawings, a base 11 supports a frame 12 and a driving motor 13. The motor 13 drives a shaft 14 which is connected at one end to a shaft 18 by a driving chain 19. The shaft 18 is connected through a gear box 22 to a cam shaft 23 rotatably supported on the frame 12. A chain 27 interconnects the shaft 23 with a shaft 28 driving a magnetic clutch 31. The clutch 31 in turn drives a shaft 32 which has secured thereto sprockets 33 which drive a conveyor chain 34 having recesses 35 for receiving and carrying work parts 36.

Each work part 36 comprises a rubber-insulated wire 39 extending through a tubular member or sleeve 40 made of copper. These work parts are to serve as terminals of capacitors which are mounted in cans (not shown) and then impregnated. The purpose of the grooves to be formed in the sleeve 40 is to prevent leakage of the impregnating fluid from the can of the capacitor between the wire 39 and the sleeve 40, the sleeve being soldered to the can.

The other end of the shaft 32 is connected to a magnetic brake 41 (FIGS. 1 and 3). Thus, the clutch 31 may be energized to drive the shaft 32 and the conveyor 34, and the brake 41 may be actuated to stop the shaft 32 and the conveyor.

A shaft 50 supports a first roller 48 immediately adjacent to a second roller 49 secured to the shaft 14. The rollers 48 and 49 are positioned adjacent to each other so that the surfaces thereof form a substantially V-shaped nest in which a work part 36 may be supported. Thus, when the rollers 48 and 49 are rotated in the same direction, the work part 36 positioned thereon will be rotated.

A first pair of circular transfer members 55 are rotatably mounted on the shaft 50 on opposite sides of the first roller 48. The transfer member 55 to the left of the roller 48 as viewed in FIG. 6 is secured to a hub 57 whereas the transfer member 55 to the right of the roller 48 is adjacent to an enlarged portion 58 of the shaft 50. The transfer members 55 are secured together by a bar 56 in order that they may rotate in unison with respect to the shaft 50 and are each provided with complementary notches 59 having configurations best illustrated in FIGS. 4, 5 and 7. The notches 59 are adapted to receive and to carry the work part 36 into the nest.

A second pair of circular transfer members 60 are rotatably mounted on the shaft 14 and are positioned on opposite sides of the second roller 49. The transfer member 60 to the left of the roller 49 is secured to a hub 62 which is also rotatable with respect to the shaft 14 and the transfer member 60 to the right of the roller 49 as viewed in FIG. 6 is positioned adjacent to an enlarged portion 63 of the shaft 14. The transfer members 60 are secured together by a bar 61 to permit them to rotate in unison with respect to the shaft 14. The transfer members 60 are also provided with notches 66 as best illustrated in FIGS. 4, 5 and 7, these complementary notches being adapted to receive and remove the work part 36 from the V-shaped nest.

A pair of gears 70 in meshing relationship are positioned rotatably on the shafts 14 and 50 and are secured to the hubs 62 and 57. In this manner, when one of the gears 70 is driven by a semi-circular gear 71, which is pivotally attached to the frame 12, both of the gears 70 will rotate to in turn rotate the hubs 57 and 62 and the transfer members 55 and 60 secured thereto respectively.

Because of the meshing of the gears 70 when the gear 71 is actuated, the transfer members 55 and 60 rotate in opposite directions with respect to the shafts 50 and 14 respectively. The shafts 14 and 50, respectively, are provided with conventional gearing including gears 72 secured thereto to the right of the frame 12 as viewed in FIG. 6 and each meshed with an intermediate gear 73 rotatably mounted in the frame 12. Thus when the shaft 14 is rotated by the motor 13 the gear 72 secured thereto will likewise rotate and through its meshing relationship with the intermediate gear 73 in mesh with the other gear 72 secured to the shaft 50, will cause the shaft 50 to rotate also and in the same direction. In this manner the two rollers 48 and 49 secured to the shafts 50 and 14, respectively, will also rotate in the same direction.

A plunger 80 operated by a cam 81 secured to the cam shaft 23 and having surfaces 81a and 81c concentric to the axis of the shaft 23, and surfaces 81b and 81d non-concentric with respect to the axis of the shaft 23, engages the gear 71 and rotates it counter-clockwise (FIGS. 4, 5 and 7) against the action of a tension spring 82. This rotates the first pair of transfer members 55 counterclockwise through a short arc (FIGS. 4, 5 and 7) and the second pair of transfer members 60 clockwise through a short arc.

A pair of spaced levers 85, having at the upper ends thereof notches 86 for receiving one at a time the work parts 36, are pivotally attached to a spring supported block 87 (FIG. 7). A tension spring 90 normally urges the lever 85 to the position illustrated in FIG. 7. The bar 56 engages the lever 85 and pivots it against the action of the spring 90 into the position illustrated in FIG. 4 for receiving a work part 36 from the conveyor. When the conveyor moves a work part 36 into the notches 86, the levers 85 and the block 87 are forced downward against their spring support to open a limit switch 91 (FIG. 7) which disables the magnetic clutch 31 and which at the same time energizes the brake 41 to stop the conveyor 34. The clutch 31 is not energized again until a cam 95 on the cam shaft 23 moves a lever 96 to close a switch 97 at which time the brake 41 is de-energized. The circuitry for effecting this operation may be of any convenient arrangement.

A forming roller 100 is supported by a L-shaped member 101 pivoted to a shaft 102 attached to the frame 12. The forming roller 100 is provided with a plurality of raised peripheral flanges 105 which are adapted to engage the tubular member or sleeve 40 and form grooves therein as this member is rotated by the rollers 48 and 49. A tension spring 106 urges the L-shaped member 101 upward to bring a cam follower 107 into engagement with a cam 110 secured to the cam shaft 23 and having surfaces 110a and 110c concentric to the axis of the shaft 23, and surfaces 110b and 110d non-concentric with respect to the axis of the shaft 23. Thus, rotation of the cam 110 will move the forming roller 100 downward into engagement with the tubular member 40 as illustrated in FIG. 4.

*Operation*

In general, the operation of the instant device involves three separate phases, namely, a "hold and groove forming" phase as illustrated in FIG. 4, a combination "transfer and discharge" phase wherein the elements move from the position shown in FIG. 4 to the position shown in FIG. 7, and a "transfer" phase wherein the elements move back to the "hold and groove forming" position of FIG. 4. In the "hold and groove forming" phase, the L-shaped member 101 and the transfer members 55 and 60 remain stationary while the forming roller 100 forms grooves in a work part 36 positioned on the rotating rollers 48 and 49. Further, during this phase the conveyor 34 is operated to move a succeeding work part 36 into the notches 86 of the levers 85. In the combination "transfer and discharge" phase, the levers 85 transfer a work part 36 to a position where it may be picked up by the transfer members 55 and a completed work part 36 is discharged from the transfer members 60. During the "transfer" phase the levers 85 move back to a work part receiving position and the transfer members 55 transfer the work part just removed from the levers 85 to a work position on the rollers 48 and 49, as shown in FIG. 4, whereupon the cycle of operation is repeated.

Referring to FIG. 4, which shows the elements in their respective positions at a selected point in the "hold and groove forming" phase, it is seen that the plunger 80 is in its upper-most position as determined by the configuration of the cam 81, that the cam 110 has moved the forming roller 100 into engagement with a work part 36 resting in the nest formed by the rotating rollers 48 and 49, whereby the flanges 105 are forming grooves in the tubular member 40, and that the conveyor 34 has been operated to position a work part 36 in the lever notches 86.

During the groove forming operation shown in FIG. 4 the roller 109 on the L-shaped member 101 engages the concentric cam surface 110a and the plunger 80 engages the concentric cam surface 81a, whereby the roller 100 and the transfer members 55 and 60 are held stationary.

When the groove forming process is completed the roller 109 comes into engagement with the cam surface 110b, whereby the L-shaped member 101 and the roller 100 move upwardly to a position as shown in FIG. 7, where the concentric cam surface 110c comes into operation and the member 101 remains stationary in its upper position. When the roller 100 is clear of the just completed work part the plunger 80 comes into engagement with the non-concentric cam surface 81b and is moved downwardly against the action of the spring 82 to rotate the gear 71 counterclockwise as viewed in FIG. 4, whereby the transfer members 55 and 60 rotate as indicated by the arrows in FIG. 5 to the position shown in FIG. 5. As a result of this rotation, the notches 66 in the transfer members 60 carry the completed work part 36 out of the work position and discharge it from the device (FIG. 7), and the bar 56 attached to the transfer members 55 permits the spring 90 to pivot the levers 85 and a succeeding work part 36 carried in the notches 86 to the position shown in FIG. 7, while the notches 59 in the members 55 move into position to pick up the work part from the levers.

The transfer members 55 rotate far enough to permit the work part 36 supported in the notches 86 to drop into the notches 59. The plunger 80 then comes into engagement with the concentric cam surface 81c whereby rotation of the members 55 and 60 stops. When the plunger 80 reaches the non-concentric surface 81d, it moves upwardly so that the spring 82 rotates the gear 71 clockwise as seen in FIG. 7, to reverse the direction of rotation of the members 55 and 60 as indicated by the arrows, whereby, because of the configuration of the notches 59 in the members 55, the work part is lifted from the notches 86 thereby and carried into the work position shown in FIG. 4.

As the work part 36 is being moved into the work position, the transfer members 60 rotate the notches 66 back to a work part receiving position and the bar 56 attached to the transfer members 55 engages the levers 85 and cams them back into a work part receiving position, all as shown in FIG. 4.

When the plunger 80 again reaches its uppermost limit position (FIG. 4) the levers 85 will be in a work part receiving position and, referring to FIG. 3, the cam 95 on the cam shaft 23 moves lever 96 to actuate the switch 97 to energize the clutch 31 and de-energize the brake 41, whereby the conveyor 34 is started to move another work part 36 into the notches 86. When a work part reaches the notches 86 the switch 91 is actuated by the downward pressure of the levers 85 on the block 87 to de-energize the clutch 31 and energize the brake 41 to stop the conveyor.

In addition to the starting of the conveyor 34 when the plunger 80 reaches its uppermost limit position, as it approaches the "hold" cam surface 81a the roller 109 engages the cam surface portion 110d and the cam 110 then moves the L-shaped member 101 and forming roller 100 downward into an engagement with the work part 36 just removed from the notches 86, which is by this time supported on the rotating rollers 48 and 49, the plunger 80 having reached its uppermost position and being again in engagement with concentric cam surface 81a. The roller 109 next engages the cam surface portion 110a and the parts are then back in their respective "hold and groove forming" positions as shown in FIG. 4, whereupon the above-described cycle of operation is repeated.

It is to be understood that the above-described arrangements are simply illustrative of the application of the principles of this invention. Numerous other arrangements may be readily devised by those skilled in the art which will embody the principles of the invention and fall within the spirit and scope thereof.

What is claimed is:

1. A device for forming a groove in a sleeve, comprising a base, a pair of rollers mounted on the base and positioned adjacent to each other to form a nest wherein a sleeve to be formed is supported by engagement with the surfaces of the rollers, means on the base for rotating the rollers in the same direction so as to cause the sleeve supported in the nest to rotate, a forming roller movably mounted above the nest, means for lowering the forming roller to engage the sleeve supported in the nest, said forming roller having a peripheral flange for engaging and forming a groove in the sleeve, and means on the base for feeding sleeves one at a time into position to be engaged by the forming roller.

2. A device for forming a groove in a sleeve, comprising a base, a pair of rollers mounted on the base and positioned adjacent to each other to form a V-shaped nest wherein a sleeve to be formed is supported by engagement with the surfaces of the rollers, means on the base for rotating the rollers in the same direction so as to cause the sleeve supported in the nest to rotate, a forming roller movably mounted above the nest, means for moving the forming roller into engagement with the sleeve in the nest, said forming roller having a peripheral flange for engaging and forming a groove in the sleeve, means on the base for feeding sleeves one at a time into the V-shaped nest, and means on the base for removing the sleeves from the nest after the groove has been formed therein.

3. A device for forming a groove in a sleeve, comprising a base, a pair of rollers mounted on the base and positioned adjacent to each other to form a V-shaped nest wherein a sleeve to be formed is supported by engagement with the surfaces of the rollers, means on the base for rotating the rollers in the same direction so as to cause the tsleeve supported in the nest to rotate, a forming roller movably mounted above the nest, means for moving the forming roller into engagement with the sleeve in the nest, said forming roller having a peripheral flange for engaging and forming a groove in the sleeve, means on the base for feeding sleeves one at a time into the V-shaped nest, means on the base for removing the sleeves from the nest after the grooves have been formed therein, and means on the base for actuating the removing means in timed relationship with the feeding means.

4. A device for forming peripheral grooves in a sleeve, comprising a base, a conveyor on the base for advancing the sleeve toward a work position, means on the base for driving the conveyor, a pair of rollers mounted on the base at the work position and positioned so as to define a V-shaped nest therebetween for receiving the sleeve, a first pair of transfer members positioned at opposite ends of one of the rollers and having complementary notches for receiving and carrying the sleeve, means actuated by the first pair of transfer members for moving the sleeve from the conveyor into the notches in the first pair of transfer members, said first pair of transfer members being movable to carry the sleeve from the conveyor into the V-shaped nest, a second pair of transfer members positioned at opposite ends of the other roller of said pair and having complementary notches for receiving and carrying the sleeve, said second pair of transfer members being movable to remove the sleeve from the V-shaped nest, a flanged roller movably supported above the base for engaging the sleeve in the V-shaped nest and forming grooves therein, means on the base for moving the flanged roller into engagement with the sleeve in the nest, and means actuated by the conveyor driving means for operating the pairs of transfer members and the flanged roller moving means in timed sequence, said pairs of transfer members being so arranged and constructed that said first pair positions the sleeve in the V-shaped nest prior to actuation of the flanged roller moving means and the second pair removes the sleeve from said nest after said actuation.

5. Apparatus for forming peripheral grooves in articles which comprises, a pair of article supporting rollers forming a nest for supporting an article for rotatable movement, a groove forming roller for engaging the article in the nest and forming a groove therein, said pair of article supporting rollers and said groove forming roller being movable into juxtaposition with one another to place said groove forming roller in groove forming engagement with the article, means for driving at least one of said rollers to rotate the article whereby said groove forming roller forms a groove in the periphery thereof, a plurality of article transfer means mounted for rotation about spaced parallel axes adjacent said article supporting rollers, means for feeding the article to one of said transfer means, said one transfer means being rotatable to transfer the article from said feeding means into the nest formed by said pair of article supporting rollers, another of said transfer means being rotatable to remove the article from the nest after a groove is formed in the article by said groove forming roller and to transfer the article to a position in which the article is discharged from said transfer means, means for moving said article supporting rollers and said groove forming roller into juxtaposition with one another after the article is positioned in the nest by said one transfer means, and means for rotating said plurality of transfer means in timed relationship with respect to one another and with respect to the movement of said rollers into juxtaposition with one another.

6. Apparatus for forming peripheral grooves in articles which comprises, a pair of article supporting rollers forming a nest for supporting an article for rotatable movement, a groove forming roller for engaging the article in the nest and forming a groove therein, said pair of article supporting rollers and said groove forming roller being movable into juxtaposition with one another to place said groove forming roller in groove forming engagement with the article, means for driving at least one of said rollers to rotate the article whereby said groove forming roller forms a groove in the periphery thereof, pairs of spaced article transfer members mounted for rotation about the axes of rotation of said article supporting rollers, the transfer members in each of said pairs of transfer members having substantially axially aligned article supporting elements adjacent the peripheries thereof for receiving and carrying the article, means for feeding the article to one of said pairs of transfer members, said one pair of transfer members being rotatable to transfer the article by means of the article supporting elements thereof from said feeding means into the nest formed by said article supporting rollers, another pair of said transfer members being rotatable so that the article supporting elements thereof remove the article from the nest after a groove is formed in the article by said groove forming roller and transfer the article to a position in which the article is discharged from the article supporting elements, means for moving said article supporting rollers and said groove forming roller into juxtaposition with one another after the article is positioned in the nest by said one pair of transfer members, and means for rotating said pairs of transfer members in timed relationship with respect to one another and with respect to the movement of said rollers into juxtaposition with one another.

7. Apparatus for forming peripheral grooves in articles as recited in claim 6, in which the article supporting elements are notches formed in the peripheries of said transfer members, said transfer members are interconnected for simultaneous rotation in opposite directions, and said means for rotating said pairs of transfer members includes a spring biased gear segment for driving said pairs of transfer members and a cam arranged to drive said gear segment, said cam having a configuration such that the rotatable movement of said transfer members is oscilliatory and such that said pairs of transfer members remain stationary after the article is placed into the nest by said one pair of transfer members until the groove forming operation is completed, with the notches in said other pair of transfer members being positioned to remove the article from the nest when said pairs of transfer members are subsequently rotated.

References Cited in the file of this patent

UNITED STATES PATENTS

| | | |
|---|---|---|
| 1,512,394 | Bowers | Oct. 21, 1924 |
| 1,514,589 | Foisy | Nov. 4, 1924 |
| 1,887,434 | Sammis | Nov. 8, 1932 |
| 2,312,225 | Wilkinson | Feb. 23, 1943 |
| 2,455,768 | Herman | Dec. 7, 1948 |
| 2,582,249 | Hendel | Jan. 15, 1952 |
| 2,686,551 | Laxo | Aug. 17, 1954 |
| 2,771,117 | Le Febvre | Nov. 20, 1956 |
| 2,800,942 | Parker et al. | July 30, 1957 |